(12) United States Patent
Omizo et al.

(10) Patent No.: US 6,260,151 B1
(45) Date of Patent: Jul. 10, 2001

(54) COMPUTER SYSTEM CAPABLE OF CONTROLLING THE POWER SUPPLIED TO SPECIFIC MODULES

(75) Inventors: Takashi Omizo; Yoshihiko Okazaki; Shigeki Muratake, all of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/038,628

(22) Filed: Mar. 12, 1998

(30) Foreign Application Priority Data

Mar. 14, 1997 (JP) .................................................. 9-061031

(51) Int. Cl.[7] .................................................... G06F 13/00
(52) U.S. Cl. .......................... 713/324; 713/322; 713/340
(58) Field of Search ................................... 713/800, 310, 713/320, 322, 323, 324, 330, 340; 711/105–107

(56) References Cited

U.S. PATENT DOCUMENTS

| | | | |
|---|---|---|---|
| 4,145,761 | * 3/1979 | Gunter et al. ........................ | 365/227 |
| 4,747,041 | * 5/1988 | Engel et al. .......................... | 713/300 |
| 5,300,874 | * 4/1994 | Shimamoto et al. .................. | 320/15 |
| 5,365,487 | * 11/1994 | Patel et al. ........................... | 713/300 |
| 5,596,756 | * 1/1997 | O'Brien .............................. | 713/300 |
| 5,617,572 | * 4/1997 | Pearce et al. ........................ | 713/300 |
| 5,634,106 | * 5/1997 | Yaezawa et al. ..................... | 711/106 |
| 5,640,573 | * 6/1997 | Gephardt et al. .................... | 713/300 |
| 5,692,202 | * 11/1997 | Kardach et al. ..................... | 713/300 |
| 5,781,782 | * 7/1998 | Tachikawa ........................... | 713/330 |
| 5,799,198 | * 8/1998 | Fung ................................... | 713/322 |
| 5,802,379 | * 9/1998 | Boatwright et al. ................. | 713/324 |
| 5,845,142 | * 12/1998 | Hayasaka ............................ | 713/340 |
| 5,884,087 | * 3/1999 | White et al. ......................... | 713/310 |
| 5,918,061 | * 6/1999 | Nikjou ................................ | 713/324 |
| 5,928,365 | * 7/1999 | Yoshida .............................. | 713/324 |
| 5,951,689 | * 9/1999 | Evoy et al. .......................... | 713/322 |
| 5,966,725 | * 10/1999 | Tabo ................................... | 711/106 |

* cited by examiner

Primary Examiner—Robert Beausoleil
Assistant Examiner—Raymond N Phan
(74) Attorney, Agent, or Firm—Finnegan, Henderson, Farabow, Garrett & Dunner, L.L.P.

(57) ABSTRACT

In a computer system, a control signal line directly connecting a processor to a power sequence controller is provided and a PSC interface for exchanging a control signal with the power sequence controller is built in the processor. When all the devices connected to a specific IO bus have been out of use for a long time, the processor transmits a control signal to stop the supply of power to the IO bus to the power sequence controller. This stops power from being supplied to not only the devices connected to the IO bus but also the IO bus. As a result, the unnecessarily consumed power in the computer system is reduced remarkably.

2 Claims, 8 Drawing Sheets

COMPUTER SYSTEM CAPABLE OF CONTROLLING THE POWER SUPPLIED TO SPECIFIC MODULES

BACKGROUND OF THE INVENTION

The present invention relates to a computer system suitable for, for example, easy-to-carry information equipment for personal use, and more particularly to a computer system capable of reducing the unnecessarily consumed electric power remarkably.

One known method of controlling electric power in microprocessors mounted on conventional information equipment is to reduce the power consumption by decreasing the frequency of the clock or stopping the clock when the system is idling.

Another known method of decreasing the power consumption in the entire system is to reduce the power consumption by stopping the supply of power to the input/output devices that are presently out of use.

In the techniques realizing these methods, since the component parts to which the supply of power may be stopped are limited, the unnecessarily consumed power cannot be reduced sufficiently. For example, portable information equipment operating from the power supplied from a battery pack containing a secondary battery has encountered the problem of having to shorten the possible operating time of the system.

FIG. 1 shows the configuration of a conventional computer system. In the computer system, a power supply section 34 supplies electric power under the control of a power sequence controller 33. In response to the control signal transmitted from a processor 10 via an IO bus 3a, an IO bus bridge 32, and an IO bus 3b, the power sequence controller 33 controls the power supply section 34.

In such a conventional computer system, for example, even when all the devices, including device 31a and device 31b, connected to the IO bus 3a have been out of operation for a long time, a command signal to stop the supply of power to the IO bus 3a is not transmitted to the power sequence controller 33.

As described above, the conventional computer system has the following problem: the unnecessarily consumed power cannot be reduced sufficiently and therefore the possible operating time of the system has to be shortened in portable information equipment operating from the power supplied from, for example, a battery pack containing a secondary battery.

BRIEF SUMMARY OF THE INVENTION

Accordingly, it is an object of the present invention to provide a computer system capable of reducing the unnecessarily consumed power remarkably by widening the scope of application of such power supply control as stopping the supply of power to devices that have been out of use for longer than a predetermined period of time.

According to one aspect of the present invention, there is provided a computer system comprising: a processor; a power sequence controller for controlling the supply of power of a power source in accordance with an inputted control signal; a control signal line for connecting the processor directly to the power sequence controller; and an interface circuit, provided in the processor, for interfacing the processor with the power sequence controller via the control signal line.

In the computer system, the processor may include means for, when all the devices connected to a specific input/output bus have been out of use for longer than a predetermined period of time, transmitting a command signal to stop the supply of power to the input/output bus to the power sequence controller via the interface circuit and the control signal line. In this case, the computer system may further comprise informing means for, whe n all the devices connected to the input/output bus have been out of use for longer than the predetermined period of time, notifying the processor of the fact.

The processor may include means for transmitting a command signal to stop the supply of power to the signal lines other than th e signal lines used to receive an interrupt notice from a device connected to the input/output bus and the signal lines used to receive a use-of-bus request notice from the device to the power sequence controller via the interface circuit and the control signal line, and means for, when receiving an interrupt notice or a use-of-bus request notice from the device connected to the input/output bus, transmitting a command signal to resume the supply of power to the power sequence controller via the interface circuit and the control signal line.

According to another aspect of the present invention, there is provided a computer system comprising: a processor containing at least one heavily power-consuming module including a floating point arithmetic module; and control means for controlling the supply and cut of power to the heavily power-consuming modules individually.

According to another aspect of the present invention, there is provided a computer system comprising: a processor containing at least one heavily power-consuming module including a floating point arithmetic module; and control means for controlling the supply and cut of a clock to the heavily power-consuming modules individually.

The computer system may further comprise a clock conversion device that is provided between an oscillation circuit and the heavily power-consuming module and is capable of converting the frequency of an inputted clock stepwise in the range from the original frequency to the stopping state in accordance with an inputted control signal. In this case, the control means may include means for, when the supply of the clock to the heavily power-consuming module is stopped, transmitting a control signal to the clock conversion device such that the frequency of the clock is converted stepwise in the direction of changing from the original frequency toward the stopping state, and when the supply of the clock to the heavily power-consuming module is resumed, transmitting a control signal to the clock conversion device such that the frequency of the clock is converted stepwise in the direction of changing from the stopping state toward the original frequency.

The computer system may further comprise sensing means for sensing the remaining capacity of a battery serving as a power supply. In this case, the control means may include means for adjusting the frequency of the clock supplied to the heavily power-consuming module in accordance with the remaining capacity of the battery sensed by the sensing means.

According to another aspect of the present invention, there is provided a computer system comprising: a power sequence controller for controlling the supply of power of a power source in accordance with an inputted control signal; at least one dynamic RAM chip; and a processor including means for, when the dynamic RAM chips have not been accessed for longer than a predetermined period of time, transmitting a command signal to stop the supply of power to the dynamic RAM chip to the power sequence controller.

The computer system may further comprise. informing means for, when the dynamic RAM chips have not been accessed for longer than the predetermined period of time, notifying the processor of the fact.

The computer system may further comprise relocation means for relocating the data items now in use scattered in the dynamic RAM chips so that they may be stored in the smallest number of dynamic RAM chips.

The computer system may further comprise determining means for determining whether or not the data items on the dynamic RAM chips have to remain stored. In this case, the processor may include means for, when receiving a notice from the informing means, transmitting a command signal to switch to the self-refreshing mode to the dynamic RAM chips that, in the determination of the determining means, have to continue storing the data, and transmitting to the power sequence controller a command signal to stop the supply of power to the dynamic RAM chips that, in the determination of the determining means, need not continue storing the data.

According to another aspect of the present invention, there is provided a computer system comprising: at least one dynamic RAM chip; and a processor for, when the dynamic RAM chips have not been accessed for longer than a predetermined period of time, transmitting a command signal to switch to a self-refreshing mode to the dynamic RAM chips, the self-refreshing mode enabling a refreshing operation to be repeated voluntarily without an externally inputted control signal.

The computer system may further comprise informing means for, when the dynamic RAM chips have not been accessed for longer than the predetermined period of time, notifying the processor of the fact.

The computer system may further comprise relocation means for relocating the data items now in use scattered in the dynamic RAM chips so that they may be stored in the smallest number of dynamic RAM chips.

The computer system may further comprise determining means for determining whether or not the data items on the dynamic RAM chips have to remain stored. In this case, the processor may include means for, when receiving a notice from the informing means, transmitting a command signal to switch to the self-refreshing mode to the dynamic RAM chips that, in the determination of the determining means, have to continue storing the data, and transmitting to the power sequence controller a command signal to stop the supply of power to the dynamic RAM chips that, in the determination of the determining means, need not continue storing the data.

According to another aspect of the present invention, there is provided a computer system comprising: a power sequence controller for controlling the supply of power of a power source in accordance with an inputted control signal; a ROM chip; and a processor including means for, when the ROM chip has not been accessed for longer than a predetermined period of time, transmitting a command signal to stop the supply of power to the ROM chip to the power sequence controller.

The computer system may further comprise informing means for, when the ROM chip has not been accessed for longer than the predetermined period of time, notifying the processor supervising the control of the entire system of the fact.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Hereinafter, referring to the accompanying drawings, embodiments of the present invention will be explained.

First Embodiment

A first embodiment of the present invention will be explained.

Figure 1:
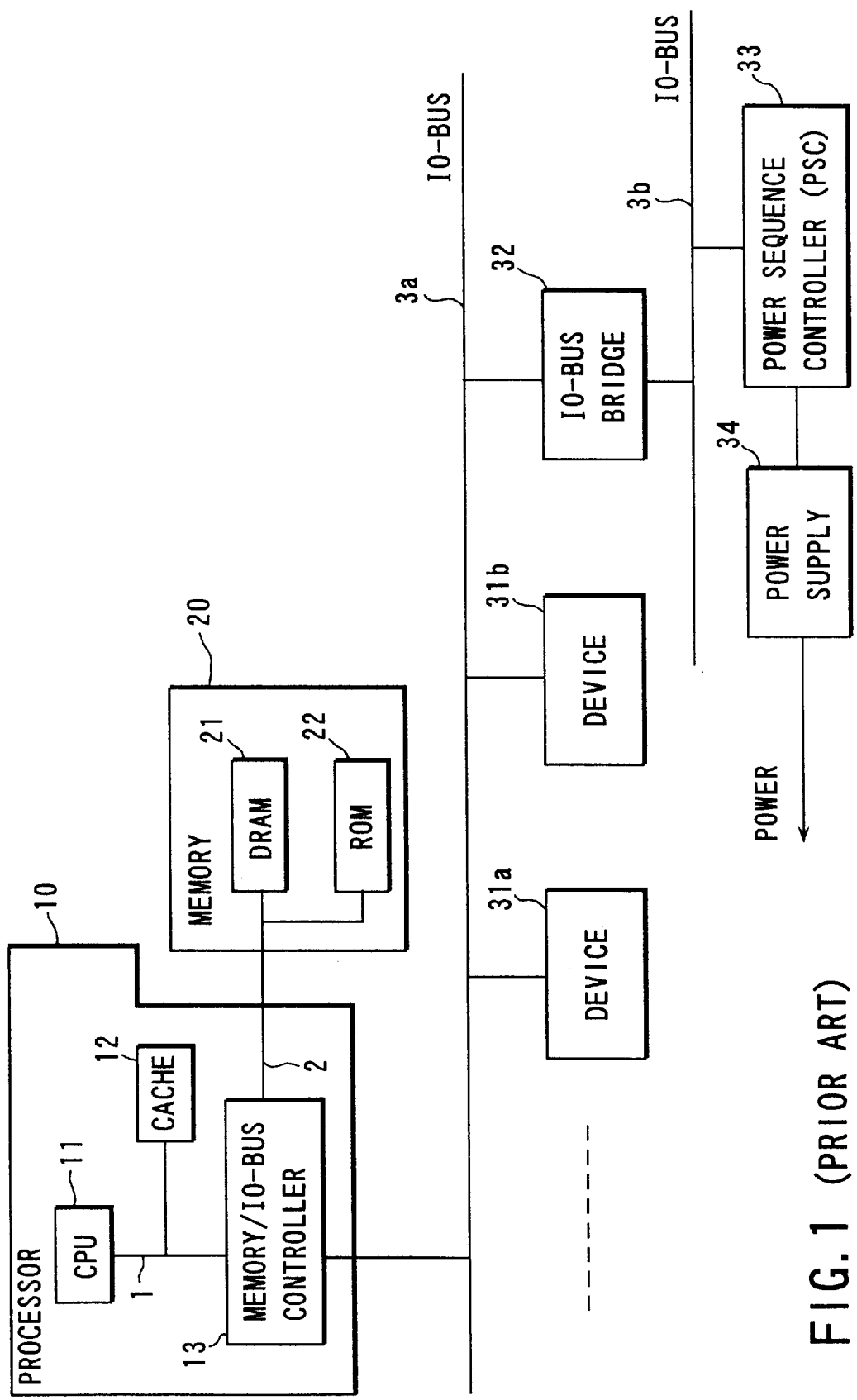
FIG. 1 shows the configuration of a conventional computer system.
Figure 2:
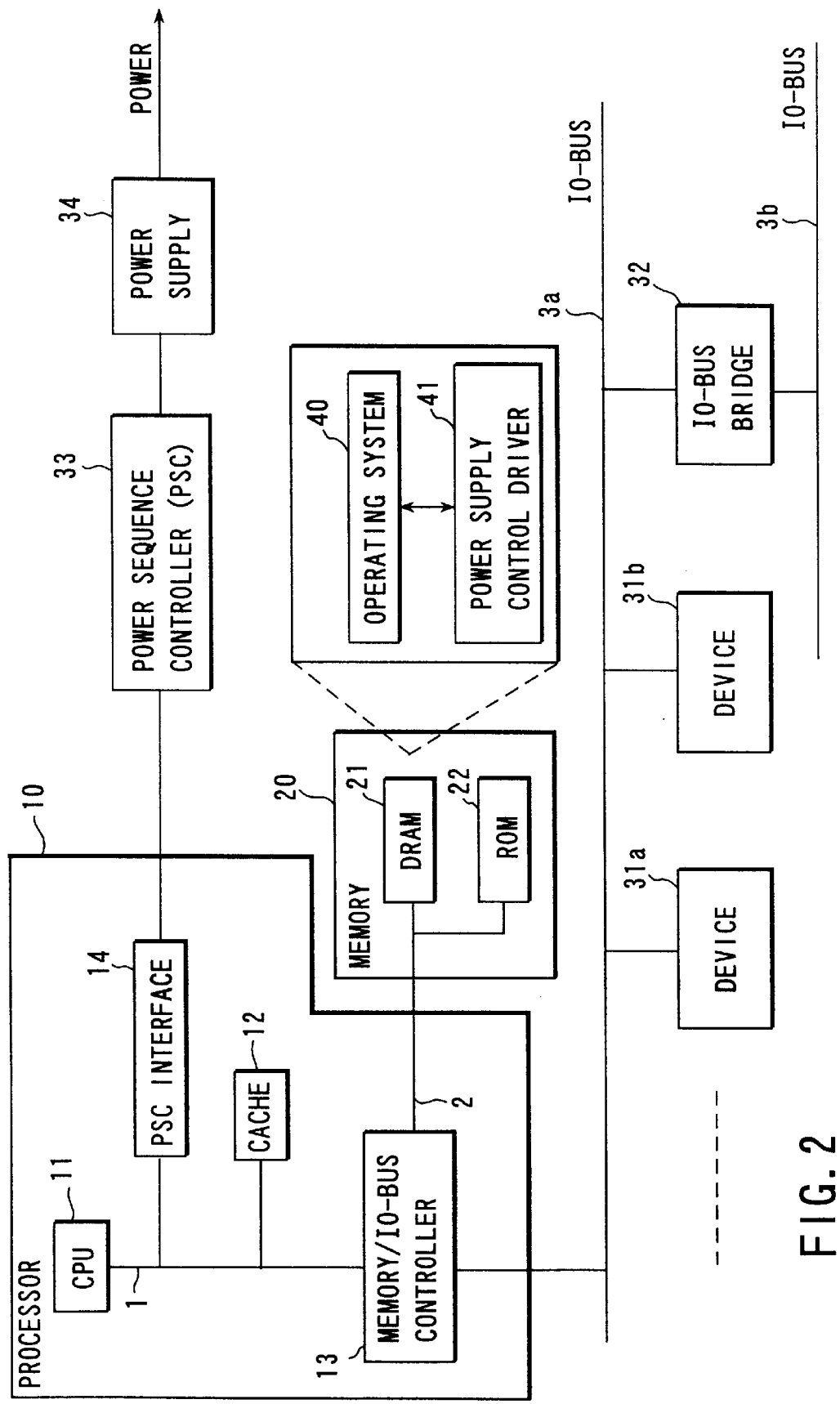
FIG. 2 shows the configuration of a computer system according to a first embodiment of the present invention.

FIG. 2 shows the configuration of a computer system according to a first embodiment of the present invention. As shown in FIG. 2, a processor 10 is directly connected to a power sequence controller 33 with a control signal line in the computer system of the first embodiment. The processor 10 contains a power sequence controller interface (PSC interface) 14, which is an interface for exchanging a control signal with the power sequence controller 33. Specifically, in the computer system of the first embodiment, none of an IO bus 3a, an IO bus bridge 32, and an IO bus 3b intervene between the processor 10 and the power sequence controller 33. Consequently, for example, when all the devices, including a device 31a and a device 31b, connected to the IO bus 3a have been out of use for a long time, it is possible to stop the supply of power to not only these devices but also the IO bus 3a.

A concrete instrumentation of the control signal line and PSC interface 14 will be described by reference to FIG. 3.

Figure 3:
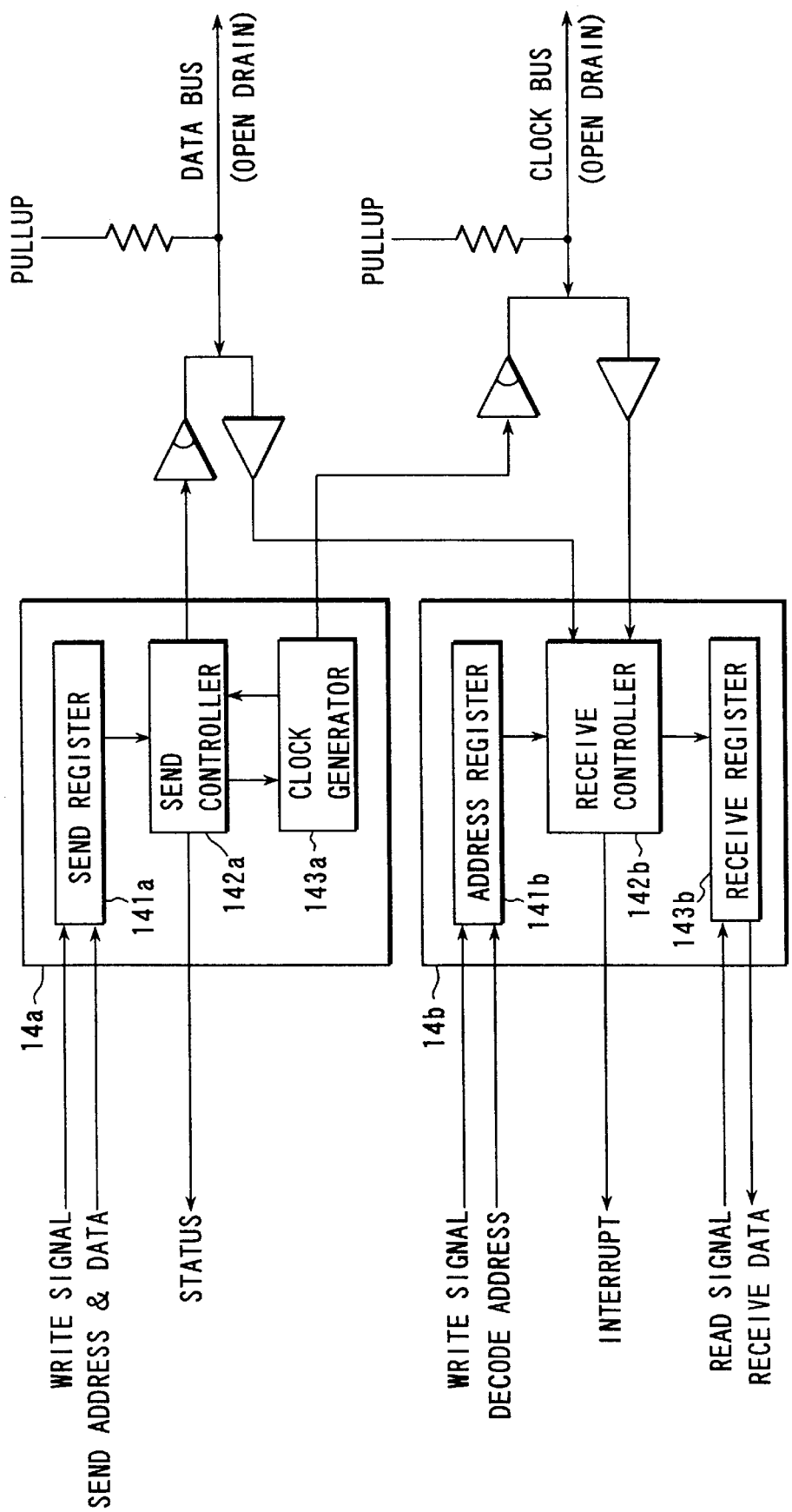
FIG. 3 shows the configuration of the PSC interface in the first embodiment.

As shown in FIG. 3, the control signal line is composed of a data bus for transferring data and a clock bus for transferring a clock signal. The PSC interface 14 includes a send section 14a for sending the data (including destination addresses and command code) from the CPU 11 to the control signal line and a reception section 14b for receiving the data from the control signal line and informing the CPU 11 of the data reception. The send section 14a includes a send register 141a, a send controller 142a, and a clock generator 143a. The reception section 14b includes an address register 141b, a receive controller 142b, and a receive register 143b. Hereinafter, the operation of the above configuration will be explained.

First, the procedure for transmission will be described. After the CPU 11 has written a destination address and data into the send register 141a, the send controller 142a is started. The send controller 142a then transfers the address and data serially to the data bus in synchronization with the clock signal generated from the clock generator 143a. The clock signal generated from the clock generator 143a is sent to the clock bus. The send controller 142a informs the CPU 11 of the transmission status. The CPU 11 checks the transmission status to see if the transmission has been completed.

Next, the procedure for reception will be explained. The receive controller 142b receives the address and data from the data bus in synchronization with the clock signal transmitted at the same time. If the received address coincides with the address held in the address register 141b, the reception controller 142b will store the received data in the reception register 143b, assert an interrupt signal, and inform the CPU 11 that it has received the data. Reading the contents of the receive register, the CPU 11 acquires the received data.

Therefore, use of such an instrumentation enables the CPU 11 to directly instruct the power sequence controller 33 to stop the supply of power.

The processor 10 is connected to the power sequence controller 33 via the serial interface as shown in FIG. 2. In addition to this, they may be connected to each other in the following method.

When supporting a method of testing the internal circuitry known as the boundary scanning method, the processor 10 includes a test logic composed of a test access port controller, a test-data-in terminal for externally inputting commands and data serially into the test logic, and a test-data-out terminal for outputting the data from the test logic to outside circuitry. The processor may be connected to the power sequence controller via these terminals. Moreover, either the terminals or the serial interface may be used depending on use.

The operating system 40 stored in the memory 20 and executed on the CPU 11 senses via the memory/IO-bus controller 13 that all of the devices connected to the IO bus 3a have been out of use for longer than a predetermined period of time. Sensing the fact, the operating system 40 starts the power supply control driver 41, which then controls the power sequence controller 33 to stop the supply of power to the IO bus 3a. Namely, the power supply control driver 41 controls the power sequence controller 33 via the PSC interface 14, thereby stopping the supply of power to the IO bus 3a.

Figure 4:
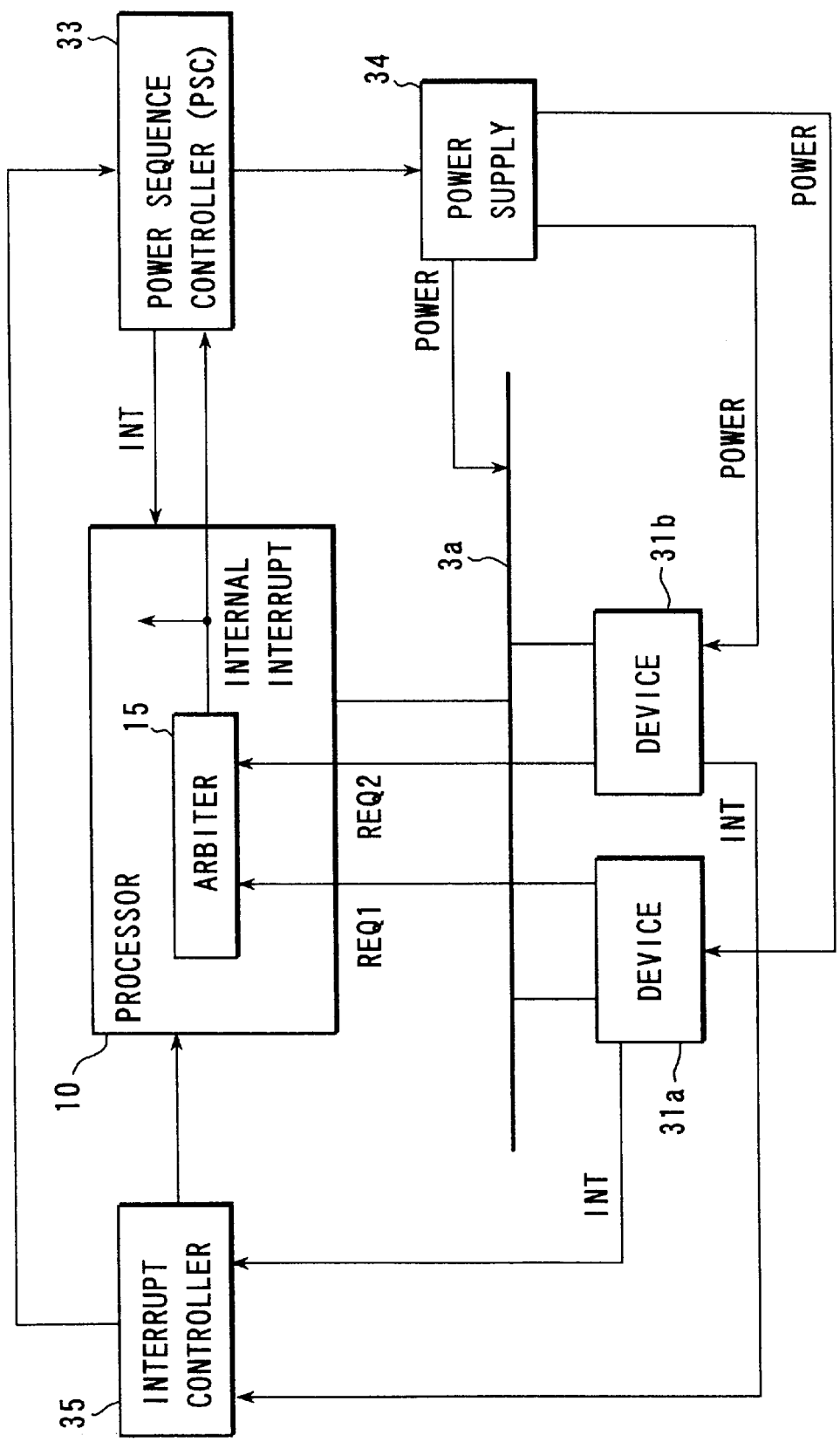
FIG. 4 is a diagram to help explain the principle of the operation of resuming the supply of power to the IO bus when a device in the first embodiment has issued an interrupt notice or a use-of-bus request notice.

In the computer system of the first embodiment, even when the supply of power to the IO bus 3a is stopped, the power is allowed to remain supplied to the signal line used to receive an interrupt notice from a device 31 connected to the IO bus 3a and to the signal line used to receive a use-of-bus request notice from the device. When the device 31 has issued an interrupt notice or a use-of-bus request notice, the supply of power to the IO bus 3a is resumed. The principle of the operation at that time will be described by reference to FIG. 4.

When the device 31a generates an interrupt, the interrupt notice is transmitted to an interrupt controller 35. The interrupt controller 35 then informs the processor 10 of the notice. The notice is also transmitted to the power sequence controller 33. For example, when the processor 10 is in the off state, the power sequence controller 33 turns on the processor 10 at the time when it receives the notice, thereby causing the processor 10 to receive the notice from the interrupt controller 35.

In the processor 10 that has received the interrupt notice, the operating system 40 executed on the processor 10 starts the power supply control driver 41. The power supply control driver 41 drives the power sequence controller 33 via the PSC interface, thereby resuming the supply of power to the IO bus 3a.

For example, when the device 31a generates a request to use the IO bus 3a, the use request notice is transmitted to an arbiter 15 inside the processor 10. The arbiter 15 arbitrates in the right to use the input/output bus. Receiving the use request notice, the arbiter 15 generates an internal interrupt. At that time, the arbiter 15 also transmits the notice to the power sequence controller 33. For example, when the processor 10 is in the off state, the processor 10 is turned on at the time when the power sequence controller 33 receives the notice, thereby causing the processor 10 to receive the internal interrupt from the arbiter 15.

In the processor 10 that has received the internal interrupt, the operating system 40 executed on the processor 10 starts the power supply control driver 41. The power supply control driver 41 then drives the power sequence controller 33, thereby resuming the supply of power to the IO bus 3a.

That is, with the computer system of the first embodiment, when all the devices connected to the IO bus have been out of use for a long time, the supply of power to the l0 bus can be stopped. As a result, it is possible to reduce the wastefully consumed power.

Second Embodiment

Figure 5:
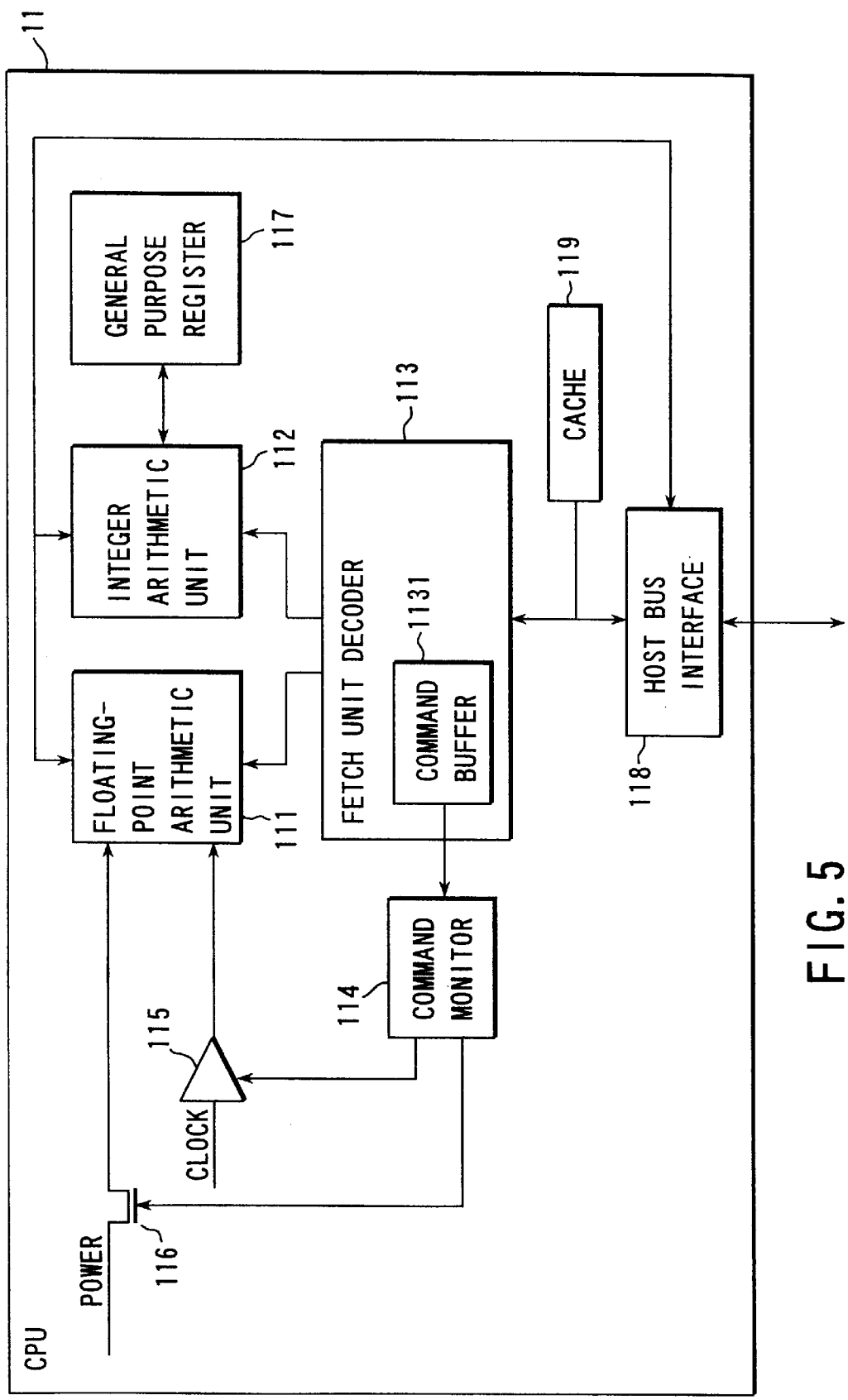
FIG. 5 shows the configuration of a CPU in a second embodiment of the present invention.

A second embodiment of the present invention will be explained. A computer system according to the second embodiment saves electric power by controlling the supply and cut of power and a clock signal to a heavily power-consuming module, such as a floating point arithmetic module built in a CPU, depending on whether the module is now in use or not. FIG. 5 shows the configuration of a CPU 11 in the second embodiment.

As shown in FIG. 5, in the CPU 11 of the second embodiment, a floating point arithmetic unit 111 and an integer arithmetic unit 112 operate on the basis of the result of decoding at a fetch unit decoder 113. Of these two arithmetic units, the floating point arithmetic unit 111 is treated in the second embodiment as a heavily power-consuming module.

Figure 6:
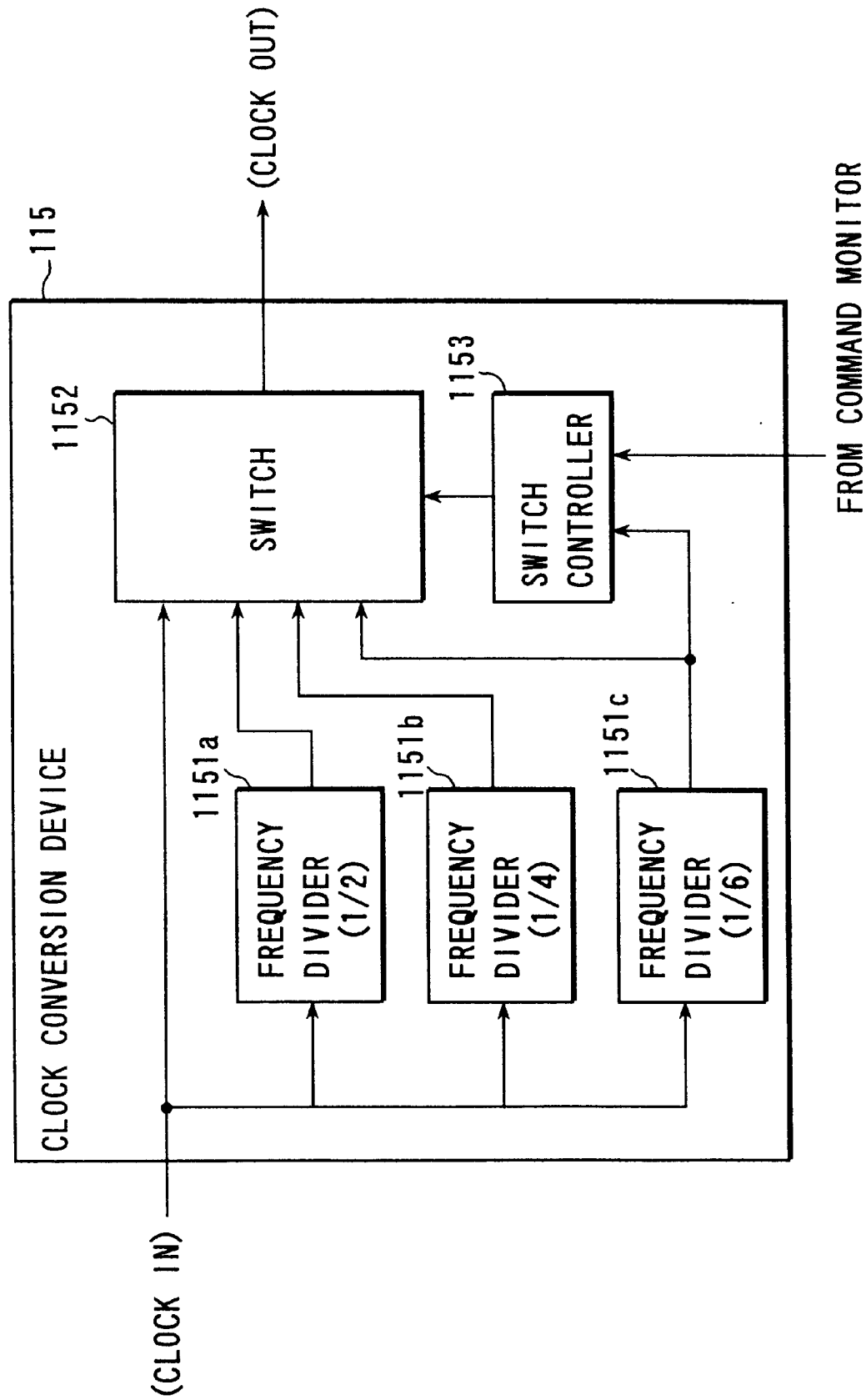
FIG. 6 shows the configuration of the clock conversion device in the second embodiment.
Figure 7:
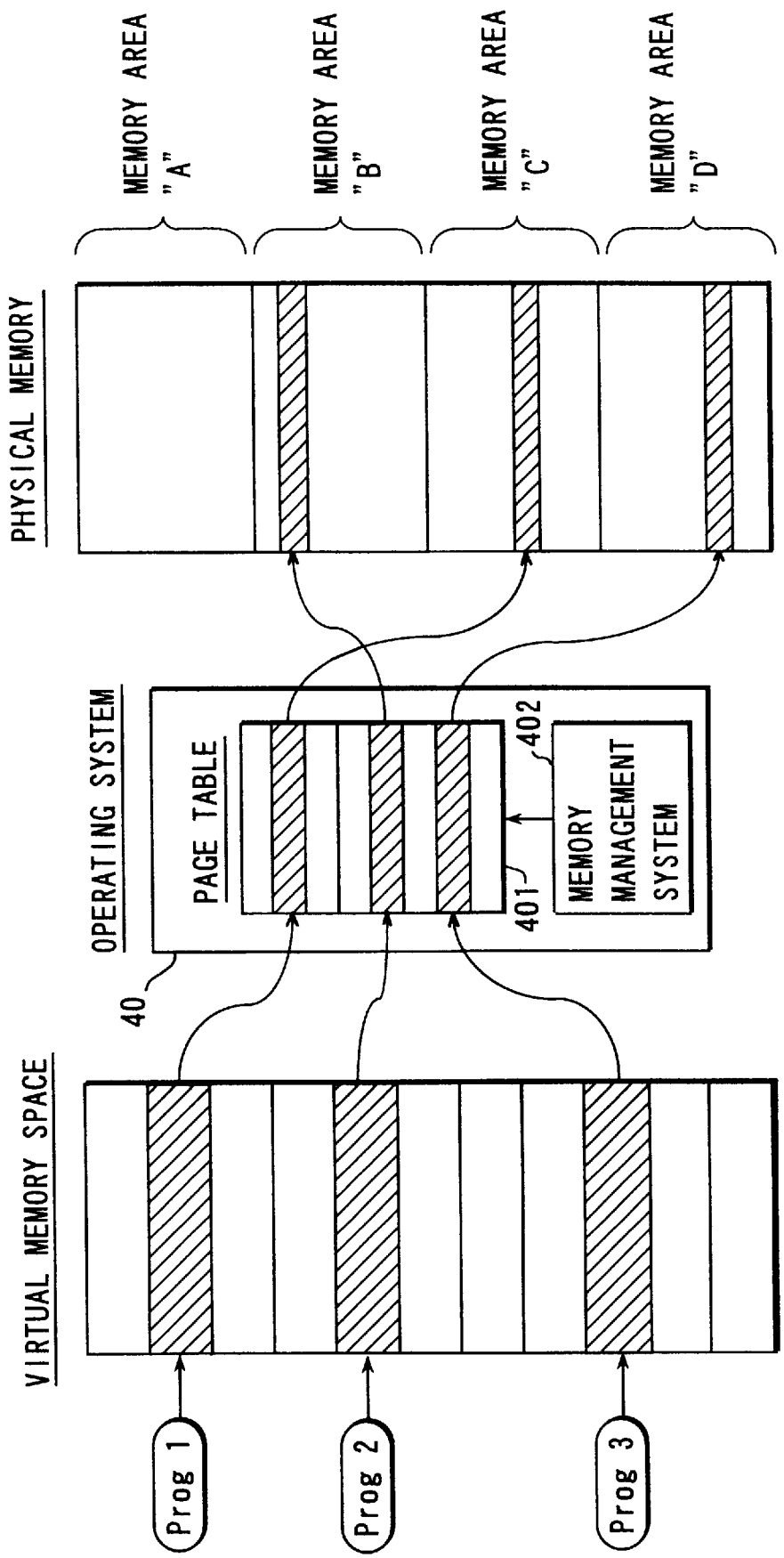
FIG. 7 is a diagram to help explain the way of relocating data items scattered over memory areas into the smallest number of memory areas in a third embodiment (before relocation)

A command monitor 114 checks a command buffer 1131 in the fetch unit decoder 113 to see if the buffer has stored a command involving the operation of the floating point arithmetic unit 111. On the basis of the result of the monitoring, the command monitor controls the supply and cut of power and a clock signal to the floating point arithmetic unit 111. Specifically, during the time when the command buffer 1131 has not stored a command involving the operation of the floating point arithmetic unit 111, the switch 116 is turned off to stop the supply of power to the floating point arithmetic unit 111, thereby reducing the power consumption, or a clock conversion device 115 is controlled so as to stop the supply of the clock signal to the floating point arithmetic unit 111, thereby reducing the power consumption. Both the power supplying and cutting mechanism and the clock signal supplying and cutting mechanism may be provided, or either the former or the latter may be provided. Concerning the supply and cut of the clock signal, it is desirable that the clock conversion device 115 should change the frequency of the clock signal stepwise at specific intervals, taking into account the occurrence of noise. FIG. 6 shows the configuration of the clock conversion device 115 that realizes the stepwise change of the frequency.

As shown in FIG. 6, the clock conversion device 115 includes frequency dividers 1151a to c with different frequency dividing factors (½, ¼, and ⅛), which each divide the frequency of the inputted clock and output the resulting signal to a switch 1152. A switch controller 1153 operates in synchronization with the lowest-frequency clock supplied from the frequency divider 1151c. When the command monitor 114 has transmitted a signal to stop the supply of the clock to the floating point arithmetic unit 111, the switch controller switches the frequency of the clock outputted from the switch 1152 from the original frequency to a ½ frequency, a ¼ frequency, and to ⅛ frequency in that order at predetermined intervals and then cuts off the clock. On the other hand, when the command monitor 114 has transmitted a signal to resume the supply of the clock to the floating point arithmetic unit 111, the switch controller switches the frequency of the clock outputted from the switch 1152 from the ⅛ frequency to the ¼ frequency, the ½ frequency, and to the original frequency in that order at predetermined intervals. The stepwise switching at predetermined intervals may be fully controlled by the control signal from the command monitor 114 (i.e., the command monitor 114 specifies which frequency the present frequency should be switched to). This makes it possible to convert the frequency of the clock supplied to the floating point arithmetic unit 111 stepwise in the range from the original frequency to the stopping state.

Use of the clock conversion device 115 capable of converting the frequency of the clock stepwise enables the power consumption to be controlled in accordance with the amount of the remaining power in the battery serving as a power source. For example, in a computer system where a battery pack housed detachably in the body of an information instrument is composed of cells and the cells are used in sequence, the frequency of the clock supplied to the floating point arithmetic unit 111 can be switched stepwise in accordance with the number of the remaining unused cells.

That is, with the computer system of the second embodiment, because the supply and cut of power to a heavily power-consuming module, such as the floating point arithmetic unit 111, can be controlled, depending on whether it is now in use or not, the wastefully consumed power can be reduced.

Third Embodiment

Hereinafter, a third embodiment of the present invention will be explained. A computer system according to the third embodiment saves electric power by controlling the supply and cut of power to a dynamic RAM chip, depending on whether or not the dynamic RAM chip is accessed for data reading or writing.

For the power saving control to produce a remarkable effect, the computer system creates unused memory areas actively by relocating data items now in use scattered over more than one memory areas such that they are stored in the smallest number of memory areas and thereby stopping the supply of power to as many dynamic RAM chips as possible.

The configuration of the computer system of the third embodiment is similar to that of the first embodiment, so explanation will be given referring to FIG. 2.

The operating system 40 stored in the memory 20 and executed on the CPU 11 includes a page table 401 for relating a virtual memory space to a physical memory and a memory management system 402 for managing memory resources on the basis of the page table 401. It is assumed that three programs (Prog1 to Prog3) are in operation on the system and the data items used by these programs are scattered over memory areas A to D. In such a situation, the operating system 40 starts the power supply control driver 41 to stop the supply of power to the dynamic RAM chip constituting memory area A. In this way, the computer system of the third embodiment saves electric power by reducing the power supplied to the dynamic RAM chip constituting an unused memory area.

Figure 8:
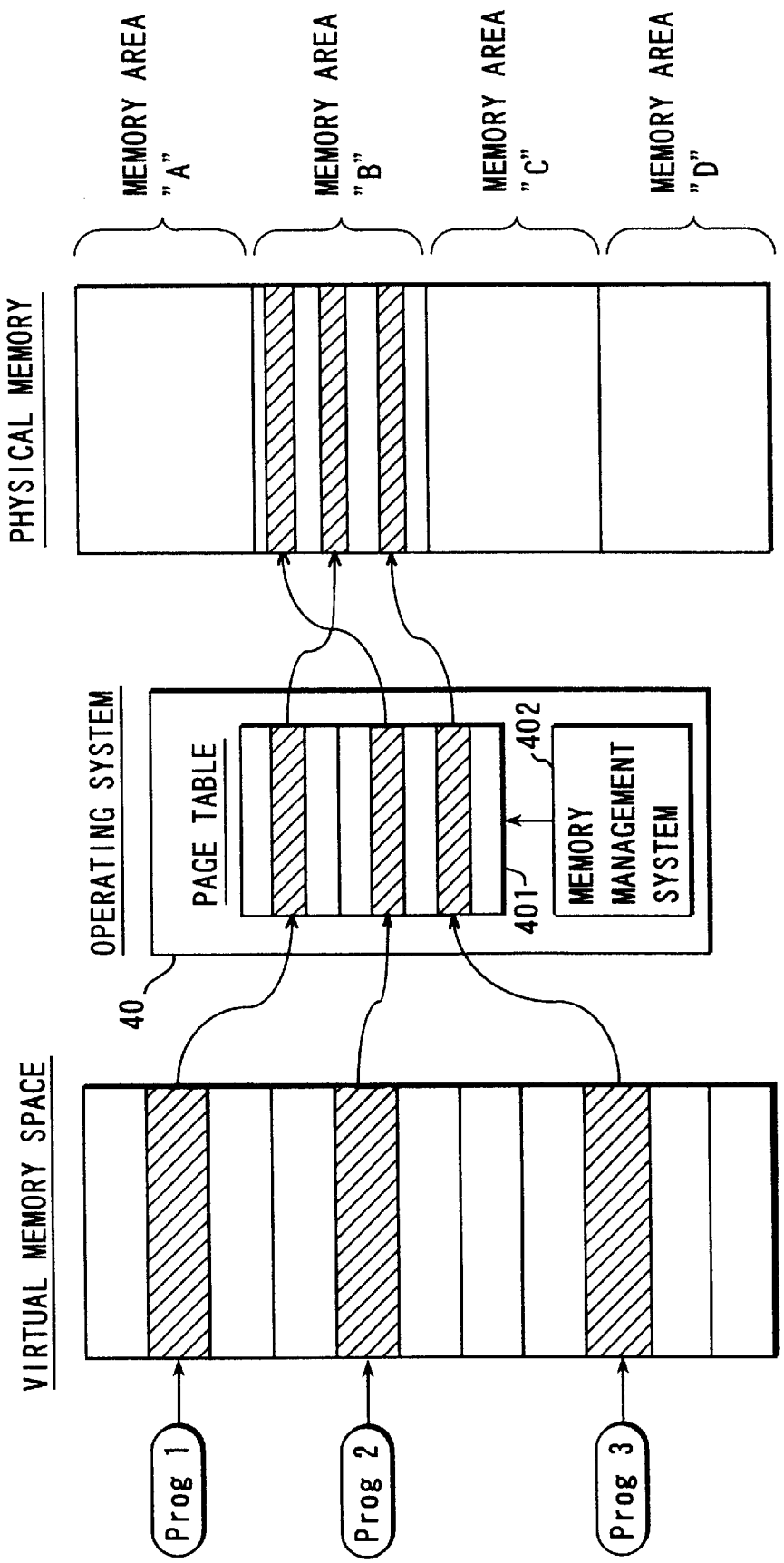
FIG. 8 is a diagram to help explain the way of relocating data items scattered over more than one memory areas into the smallest number of memory areas in the third embodiment (after relocation).

Furthermore, as shown in FIG. 8, the memory management system 402 relocates those data items into the smallest number of memory areas (in this case, memory area B). Thereafter, the operating system 40 starts the power supply control driver 41 to stop the supply of power to not only the dynamic RAM chip constituting memory area A but also the dynamic RAM chip constituting memory area C and memory area D. In this way, the computer system of the third embodiment actively creates unused memory areas and performs power saving control by reducing the supply of power to the dynamic RAM chips constituting the unused memory areas. Consequently, the power saving control produces a more remarkable effect.

Instead of stopping the supply of power to the dynamic RAM chip, a self-refreshing mode may be used. In the self-refreshing mode, a refreshing operation is repeated voluntarily without an externally inputted control signal. That is, the necessity of operating an external control mechanism for refreshing the dynamic RAM chip is eliminated, thereby saving electric power.

When both the suspension of the supply of power and the shift to the self-refreshing mode are used, the operating system running on the computer system may be caused to determine whether or not the memory areas have each held the data items needed to remain stored, bring the dynamic RAM chips constituting the memory areas holding the data items needed to remain stored into the self-refreshing mode, and stop the supply of power to the dynamic RAM chips constituting the memory areas not holding the data items needed to remain stored.

Furthermore, as with the dynamic RAM chips, the supply of power to the ROM chips constituting the memory areas which have not been accessed for longer than a predetermined period of time may be stopped.

Specifically, with the computer system of the third embodiment, because the supply and cut of power to the dynamic RAM chips or ROM chips can be controlled depending on whether they are accessed or not, the wastefully consumed power can be reduced. Moreover, more effective power saving can be effected by actively creating memory areas to which the supply of power can be stopped.

While in the third embodiment, the case where the supply of power to the dynamic RAM (DRAM) chips and ROM chips is stopped has been explained, the present invention is not restricted to this. For instance, the present invention may be applied to synchronous DRAM (SDRAM) chips. Furthermore, in the case of memory chips (e.g., SDRAM chips) that operate in synchronization with the clock signal, the supply of the clock signal may be stopped instead of stopping the supply of power.

As described in detail, with the computer system of the present invention, it is unnecessary to cause an input/output device shared with other devices to intervene between the processor and the power sequence controller. When all the devices connected to the bus have been out of use for longer than a predetermined period of time, the supply of power to the input/output bus can also be stopped, enabling the wastefully consumed power to be reduced.

Furthermore, because the supply and cut of power to a heavily power-consuming module can be controlled depending on whether the module is in operation or not, the wastefully consumed power can be reduced.

Moreover, because the supply and cut of power to the dynamic RAM chips and ROM chips can be controlled depending on whether they are accessed or not, the wastefully consumed power can be reduced.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system comprising:

a processor containing at least one power-consuming module including a floating-point arithmetic module:

control means for controlling supply and cut of a clock signal supplied to at least one of said power-consuming modules:

clock conversion means, provided between an oscillation circuit and at least one of said power-consuming modules for converting a frequency of an inputted clock stepwise in a range from an original frequency to a stopping state, wherein when the supply of the clock signal to at least one of said power-consuming modules is stopped. transmitting a control signal to said clock conversion device such that the frequency of the clock is converted stepwise in a direction of changing from the original frequency toward the stopping state. and when the supply of the clock signal to at least one of said power-consuming modules is resumed. transmitting a control signal to said clock conversion device such that the frequency of the clock is converted stepwise in a direction of changing from the stopping state toward the original frequency, sensing means for sensing a remaining capacity of a battery serving as a power supply, wherein said control means includes means for adjusting a frequency of the clock supplied to said at least one of power-consuming modules in accordance with the remaining capacity of the battery sensed by said sensing means.

2. A computer system comprising:

a processor containing power-consuming modules including a floating point arithmetic module;

control means for controlling supply and cut of a clock signal supplied to at least one of said power-consuming modules; and sensing means for sensing a remaining capacity of a battery serving as a power supply, wherein said control means includes means for adjusting a frequency of the clock signal supplied to at least one of said power-consuming modules in accordance with the remaining capacity of the battery sensed by said sensing means.

* * * * *

UNITED STATES PATENT AND TRADEMARK OFFICE
CERTIFICATE OF CORRECTION

PATENT NO. : 6,260,151 B1  
DATED : July 10, 2001  
INVENTOR(S) : Takashi Omizo et al.

Page 1 of 1

It is certified that error appears in the above-identified patent and that said Letters Patent is hereby corrected as shown below:

Column 9, claim 1,  
Line 36, "module:" should read -- module; --.  
Line 39, "modules:" should read -- modules; --

Column 10, claim 1,  
Line 7, "stopped." should read -- stopped, --.  
Line 10, "state." should read -- state, --.  
Line 12, "resumed." should read -- resumed, --.

Signed and Sealed this

Sixteenth Day of April, 2002

Attest:

Attesting Officer

JAMES E. ROGAN  
Director of the United States Patent and Trademark Office